(12) United States Patent
Hubbard et al.

(10) Patent No.: US 10,664,247 B1
(45) Date of Patent: May 26, 2020

(54) USER INTERFACE

(71) Applicant: Wells Fargo Bank, N.A., San Francisco, CA (US)

(72) Inventors: Stephen G. Hubbard, Chesterfield, MO (US); Ian Keith MacEachern, St. Louis, MO (US); Lee Thomas Lindley, Mechanicsville, VA (US); Jason Matthew Couture, St. Louis, MO (US); Andrew Cary Hall, Glen Allen, VA (US); Kurt Loreck, Caseyville, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 122 days.

(21) Appl. No.: 15/812,974

(22) Filed: Nov. 14, 2017

Related U.S. Application Data

(60) Provisional application No. 62/421,980, filed on Nov. 14, 2016.

(51) Int. Cl.
| | |
|---|---|
| *G06F 8/38* | (2018.01) |
| *G06Q 40/06* | (2012.01) |
| *G06F 3/0484* | (2013.01) |
| *G06F 8/35* | (2018.01) |
| *G06F 9/451* | (2018.01) |

(52) U.S. Cl.
CPC .............. *G06F 8/38* (2013.01); *G06F 3/0484* (2013.01); *G06F 8/35* (2013.01); *G06F 9/451* (2018.02); *G06Q 40/06* (2013.01)

(58) Field of Classification Search
CPC .................................. G06F 8/38; G06F 9/451

USPC ......................................................... 715/762
See application file for complete search history.

(56) References Cited

U.S. PATENT DOCUMENTS

| | | | |
|---|---|---|---|
| 91,905 A | 6/1869 | Brunschwiler | |
| 5,870,727 A * | 2/1999 | St Jacques | G06F 9/451 706/11 |
| D579,456 S | 10/2008 | Chen et al. | |
| D598,923 S | 8/2009 | Chen et al. | |
| 7,941,438 B2 * | 5/2011 | Molina-Moreno | G06F 8/35 707/756 |

(Continued)

OTHER PUBLICATIONS

"U.S. Appl. No. 29/615,828, Response filed Sep. 13, 2019 to Restriction Requirement dated Jun. 13, 2019", 5 pgs.

(Continued)

*Primary Examiner* — William D Titcomb
(74) *Attorney, Agent, or Firm* — Schwegman Lundberg & Woessner, P.A.

(57) ABSTRACT

Various examples are directed to systems and methods for generating a user interface. The user interface may be based at least in part on an account returns data structure that is generated based on a benchmark returns for a set of benchmark asset classes and on returns for a first account. The user interface comprises a set of columns. A first column comprises a first tile for a first benchmark asset class of the plurality of benchmark asset classes, a second tile corresponding to a second benchmark asset class of the plurality of benchmark asset classes, and a third tile corresponding to the first account. The first tile, the second tile, and the third tile may be ordered in the first column based at least in part on returns for the first account, the first benchmark asset class, and the second benchmark asset class in the first time period.

20 Claims, 14 Drawing Sheets

(56) References Cited

U.S. PATENT DOCUMENTS

| | | | |
|---|---|---|---|
| 8,275,637 B1* | 9/2012 | Glacy, Jr. | G06Q 40/08 703/3 |
| 9,454,785 B1* | 9/2016 | Hunter | G06F 16/285 |
| D771,107 S | 11/2016 | Spector | |
| 10,402,495 B1 | 9/2019 | Rush et al. | |
| 2006/0069635 A1 | 3/2006 | Ram et al. | |
| 2008/0007554 A1 | 1/2008 | Kobayashi et al. | |
| 2009/0141315 A1 | 6/2009 | Hachiro | |
| 2010/0306682 A1* | 12/2010 | Williamson | G06Q 10/10 715/764 |
| 2011/0055680 A1* | 3/2011 | Williamson | G06F 9/451 715/212 |
| 2013/0111321 A1* | 5/2013 | Dorrell | G06F 9/44 715/215 |
| 2013/0132940 A1* | 5/2013 | Meier | G06F 9/445 717/174 |
| 2013/0187957 A1* | 7/2013 | Andersson Reimer | G06Q 10/1093 345/684 |
| 2013/0205192 A1* | 8/2013 | Spada | G06F 17/2264 715/227 |
| 2013/0345663 A1 | 12/2013 | Agrawal et al. | |
| 2014/0101092 A1* | 4/2014 | Simitsis | G06F 9/451 707/602 |
| 2014/0129910 A1* | 5/2014 | Kota | G06F 17/211 715/202 |
| 2015/0058769 A1* | 2/2015 | Kim | G06F 9/451 715/765 |
| 2015/0301698 A1 | 10/2015 | Roques | |
| 2016/0092602 A1* | 3/2016 | Liu | G06F 16/904 715/738 |
| 2016/0232614 A1* | 8/2016 | Vorwerk | G06Q 40/06 |
| 2017/0010764 A1* | 1/2017 | Francisco | G06F 3/0482 |
| 2017/0083175 A1* | 3/2017 | Layman | H04L 43/045 |
| 2017/0244796 A1 | 8/2017 | Liu et al. | |
| 2018/0129365 A1 | 5/2018 | Dayan et al. | |

OTHER PUBLICATIONS

"U.S. Appl. No. 29/615,828, Restriction Requirement dated Jun. 13, 2019", 7 pgs.

Carlson, Ben, "A Wealth of Commonsense", [Online]. [Accessed Oct. 15, 2019]. Retrieved from the Internet: <URL: https://awealthofcommonsense.com/>, 6 pgs.

Osborne, James, "3 Things I Learned in 2014", Basan Asset Management, [Online]. [Accessed Oct. 15, 2019]. Retrieved from the Internet: <URL: https://basonasset.com/2014/12/24/3-things-i-learned-in-2014/>, (Dec. 24, 2014), 6 pgs.

"U.S. Appl. No. 29/615,828, Non Final Office Action dated Nov. 7, 2019".

Boots, "Don't Chase the Hot Dot", afsplan.com, [URL:https: afsplan.com dont-chase-the-hot-dot ], (Oct. 19, 2013), 2 pgs.

Hall, "Our Survey Helps Align Potential Clients with Our Firm's Philosophy", [URL:http blog.evergreengavekal.com Oct. 17, 2014], (Oct. 17, 2014), 2 pgs.

Holmes, "Why Energy is Catching the Market's Eye", [URL:http: www.usfunds.com investor-library frank-talk why-energy-is-catching-the-markets-eye #.XbzoCvlKick], usfunds.com [online], (Apr. 21, 2014), 2 pgs.

Vorobyev, Alex, "How to Invest Around the World Better than 80% of Professional Investors [as translated]", [URL: https: alex-vorobyev.livejournal.com tag asset], alex-vorobyev.livejournal.com [online], (Jul. 19, 2013), 2 pgs.

Carlson, Ben, "Updating My Favorite Performance Chart", A Wealth of Common Sense, [Online]. Retrieved from the Internet: <URL: Retrieved from the Internet: <URL: https://awealthofcommonsense.com/>, (Jan. 2, 2015), 12 pgs.

* cited by examiner

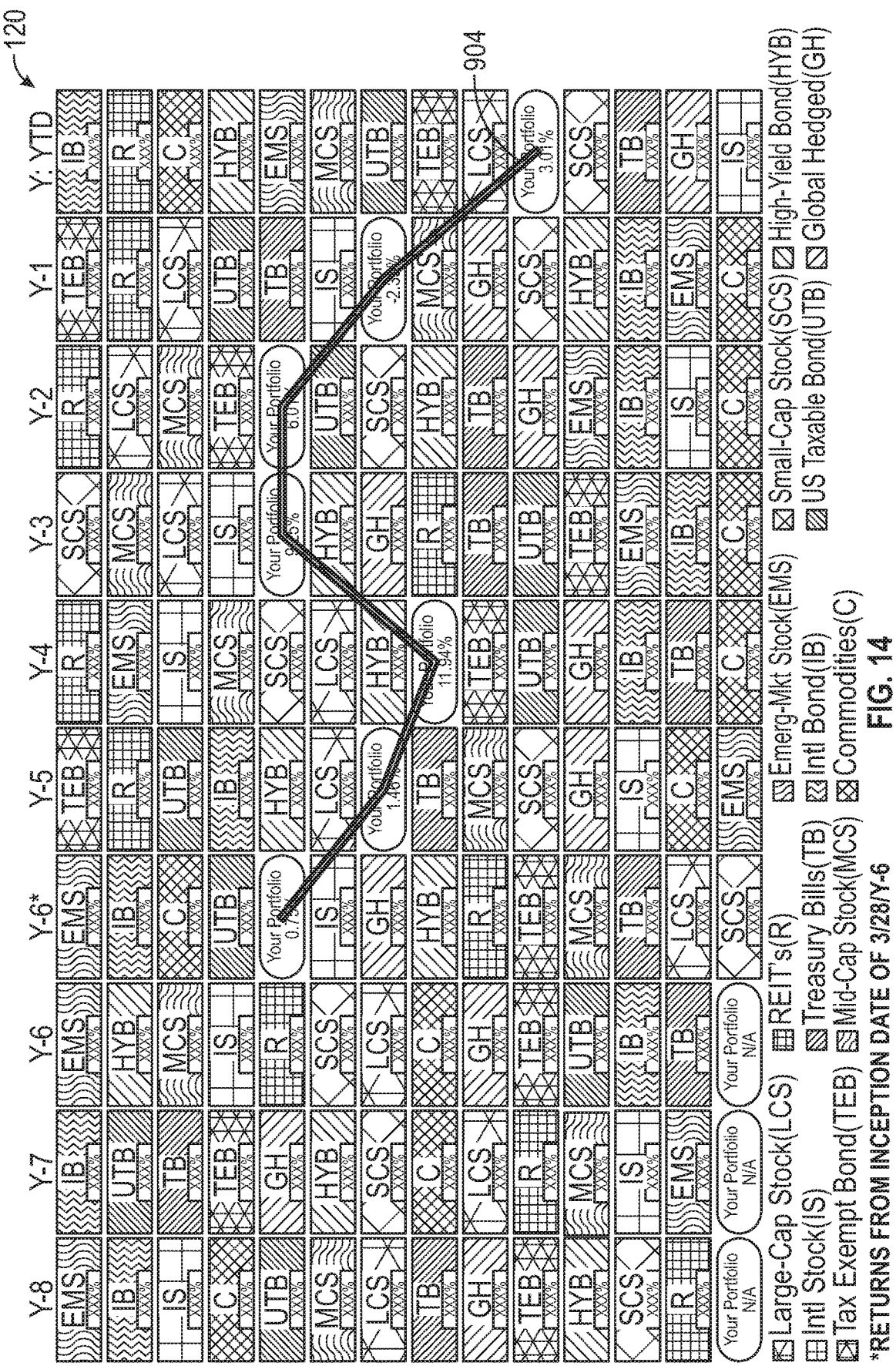

USER INTERFACE

PRIORITY

This application claims the benefit of U.S. Provisional Patent Application Ser. No. 62/421,980 filed on Nov. 14, 2016, which is incorporated herein by reference in its entirety.

TECHNICAL FIELD

Embodiments described herein generally relate to customized user interfaces including methods for quickly and efficiently generating customized user interfaces.

BACKGROUND

Evaluating the performance of a security or portfolio of securities often includes comparing the returns to those of other assets. For example, returns on a portfolio may be compared to the return on a benchmark security or index.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 14 is a screen shot showing another example of the UI of FIG. 1 including both a partial return and a full return column for the inception year of the portfolio.

DETAILED DESCRIPTION

Various examples described herein are directed to systems and methods for generating user interfaces that include comparisons between benchmark asset classes and a securities portfolio.

Various examples include generating a quilt chart interface or quilt chart. A quilt chart may include a plurality of columns where each of the plurality of columns corresponds to a time period, such as one year. Columns from the plurality of columns may include tiles, where each tile corresponds to an asset, benchmark asset class, or portfolio. Tiles may be arranged in a column in order by returns. For example, tiles corresponding to portfolios, asset classes, etc., with higher returns during the corresponding time period may be positioned higher in a column than tiles corresponding to portfolios, asset classes, etc., with lower returns in the corresponding period.

In some examples, a user interface described herein may be generated for a portfolio of securities associated with one or more client accounts. For example, a user interface may be generated for a client to provide the client with a comparison between the return of the client's portfolio versus returns on the benchmark asset classes. In some examples, a user interface (UI) generator system may generate user interfaces, as described herein, for a large number of portfolios over a short period of time, making it desirable to increase processing speed and efficiency. For example, user interfaces as described herein may be added to an electronic or paper document, incorporated into periodic performance review reports for various client portfolios, etc. In some examples, such reports are generated by financial service providers for all or a portion of their managed portfolios at the same time, for example at the conclusion of a quarter or other period. This may create a need to quickly and efficiently generate portfolio-specific interfaces. In some examples, a client or administrative user of a financial services provider may configure user portfolios or accounts to include or not include a user interface described herein. Also, in some examples, user interfaces, as described herein, may be generated and provided to users, for example, on-demand.

Figure 1:
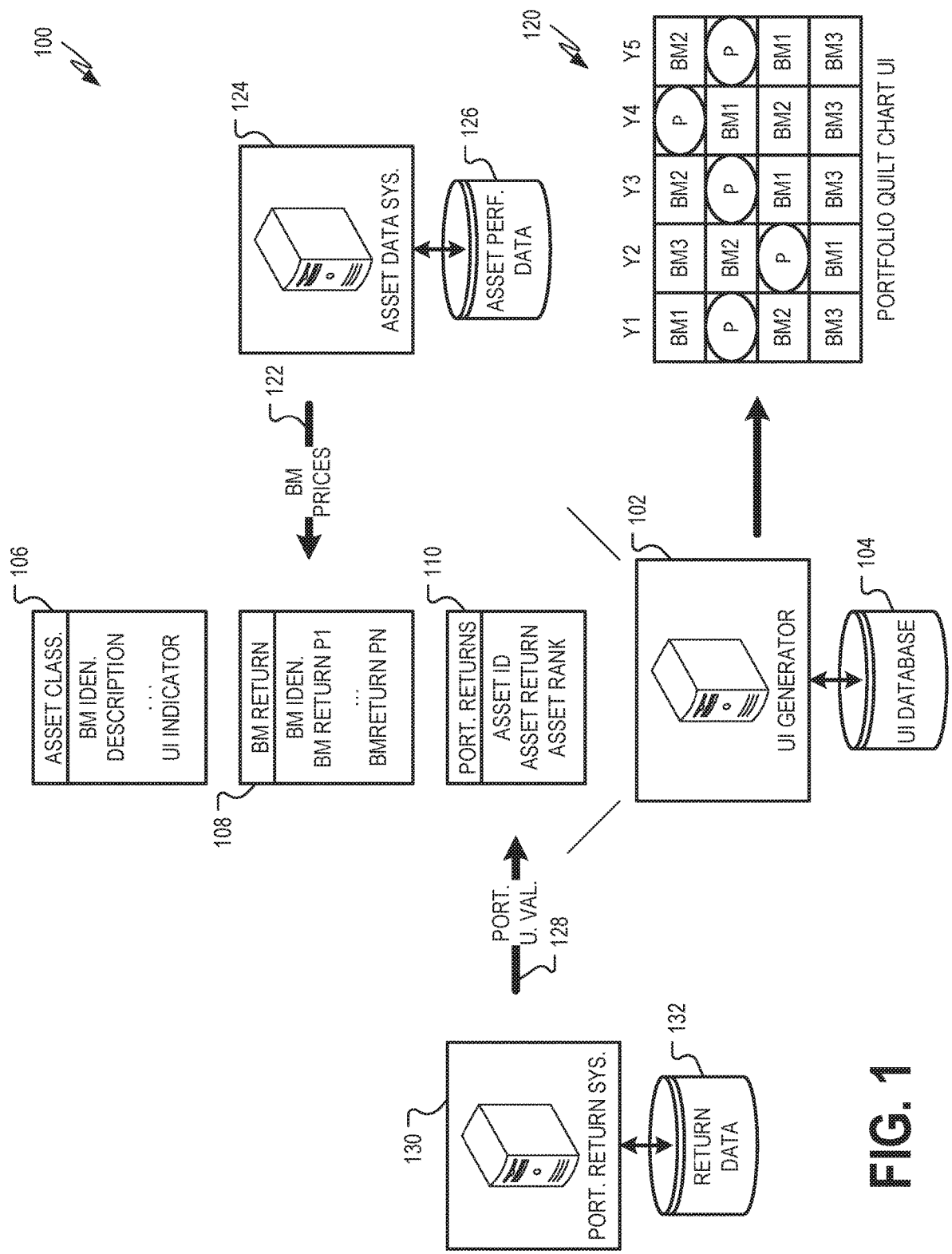
FIG. 1 is a diagram showing one example of an environment for generating a user interface, as described herein.

In various examples, a user interface (UI) generator system may generate the user interfaces as described herein utilizing a UI database and various tables or other data structures. For example, FIG. 1 is a diagram showing one example of an environment 100 for generating a UI 120, as described herein. The environment 100 comprises the UI generator system 102 and a user interface database 104.

The user interface database 104 may comprise various tables including an asset class table 106, a benchmark return table 108, and a portfolio returns table 110. In some examples, the asset class table 106 may include data describing assets and/or classes of assets that may be used as benchmarks for generating the UI 120. The UI generator system 102 utilizes the asset class table to generate a benchmark (BM) return table 108. The BM return table 108 may include data describing returns on a set of selected benchmark asset classes for the UI 120. The UI generator system 102 may incorporate portfolio-specific return data into the BM return table 108 to generate a portfolio returns table 110. The portfolio returns table 110 may then be used to generate the UI 120. In this way, the BM return table 108 may be used to generate versions of the UI 120 for multiple different portfolios (e.g., different portfolios corresponding to different accounts and/or different clients).

The tables 106, 108, 110 comprise columns and records, where each record comprises a field for each of the columns, in some examples, tables 106, 108, 110 may be or include any other similar data structure that can contain the records and relationships described herein. The tables 106, 108, 110 may be distinct components of a schema of the UI database 104. In some examples, though, one or more of the tables 106, 108, 110 may be stored at random access memory (RAM) or another data storage device of the generator system 102 and, for example, may not correspond to a distinct table at the schema of the UI database 104 or other database. For example, one or more of the tables may be an intermediate result set generated from other tables. One or more of the tables 106, 108, 110 may be or include results of a Structured Query Language (SQL) join command or other command in SQL or another suitable language. In some examples, using the various tables 106, 108, 110 in the manner described herein allows the UI generator system 102 to quickly and efficiently generate portfolio-specific UIs, such as the UI 120, for large numbers of portfolios.

The asset class table 106 may comprise records describing various asset classes that may be utilized as benchmark assets classes for the user interface. For example, records in the asset class table 106 may include a benchmark identification field (BM IDEN.) that uniquely identifies an asset class. Asset classes may include one or more assets in any suitable combination. Example asset classes may include, small capitalization equities, large capitalization equities, commodities, taxable fixed income, tax exempt fixed income, etc.

In some examples, records in the asset class table 106 may also include one or more fields providing names for the asset class, one or more fields providing description of the asset class, etc. Asset class descriptions may include descriptions of the types of assets included in the class, disclaimer or other descriptive language regarding an asset class that is to be included in the UI 120. In some examples, asset class descriptions may also include an indication of an index or other descriptor used to measure asset class values and returns. For example, a US small capitalization equities asset class may be described by the RUSSELL 2000 index, a US large capitalization equities asset class may be described by the S&P 500 index, etc. In some examples, asset class descriptions may also include formatting data describing how an asset class will be represented in the UI 120. Examples of such formatting data may include, a short name for the asset class, a color for tiles at the UI 120 representing the asset class, etc.

Also, in some examples, records in the asset class table 106 may include a user interface indicator field. Values in the UI indicator field may indicate whether the asset class corresponding to the record are to be included in the UI. For example, values in the UI indicator field may be binary (e.g., the corresponding asset class is either included in the UI 120 or not included). In some examples, values in the UI indicator may indicate that the asset class is to be included in the user interface for comparison with only some types of portfolios. For example, portfolios of different types may be compared against different benchmark asset classes, as described herein.

The UI generator system 102 may utilize the asset class table 106 to generate a BM return table 108. The BM return table 108 may include data describing asset classes from the asset class table 106 that are to be included in the UI 120. The UI generator system 102 may also supplement the BM return table 108 with price and/or return data for the selected asset classes. For example, the UI generator system 102 may receive benchmark price data 122 from one or more asset data systems 124. The benchmark price data 122 may include unit values or other indicators of prices of the benchmark asset classes. Asset data systems 124 may access asset performance data, for example, regarding asset prices, returns, etc. from an asset performance data store 126.

Although one asset data system 124 is shown, in some examples, the UI generator system 102 may be in communication with multiple asset data systems. For example, price data regarding an asset class described by the S&P 500 index may be received from an asset data system associated with that index. The UI generator system 102 may generate the BM return table 108, for example, prior to generating a batch of examples of the UI 120 for different portfolios. In some examples, a BM return table 108 may be generated at the end of a quarter or other time period at which reports including the UI 120 may be generated for a large number of accounts. The BM return table 108 may then be re-used to generate examples of the UI 120 for different portfolios.

The UI generator system 102 may utilize the BM return table 108 to generate a portfolio returns table 110 for an account. The portfolio returns table 110 may join all or part of the BM return table 108 with portfolio-specific information. For example, the UI generator system 102 may receive unit value data 128 or other price indications for a portfolio from a portfolio return system 130 in communication with a return data store 132 or other source of portfolio data. The portfolio return system 130, for example, may be associated with a financial services provider managing or providing the account. The portfolio may be a portfolio of one or more assets, for example, held by a client in one or more accounts. In some examples, the UI generator system 102 may utilize the BM return table 108 to generate multiple examples of the UI 120 for different accounts. For example, the UI generator system 102 may utilize a single BM return table 108 to generate portfolio returns tables 110 for multiple accounts. In this way, the UI generator system 102 may quickly and efficiently generate multiple examples of the UI 120 for different portfolios.

The UI generator system 102 may generate the UI 120, for example, from the portfolio returns table 110. The example UI 120 generates one example way that data from the portfolio returns table 110 may be formatted and displayed. In the example of FIG. 1, the UI 120 comprises five columns labeled Y1, Y2, Y3, Y4, and Y5. The columns correspond to five time periods. In the example of FIG. 1, the five time periods are years, for example, consecutive years.

Each of the columns Y1, Y2, Y3, Y4, Y5 includes a plurality of labeled tiles corresponding to benchmark asset classes (tiles BM1, BM2, BM3) or the account (tile P). Within a particular column, the tiles may be arranged in order of returns on the corresponding asset class or account during the time period corresponding to the time period, for example, in ascending order from top to bottom. For example, in FIG. 1 during the year Y1, the asset class corresponding to the tile BM1 had the highest return, while the asset class corresponding to the tile BM3 had the lowest return. Although not shown in FIG. 1, the tiles BM1, BM2, BM3, P may include additional information including, for example, a short description of the asset class or portfolio, an indication of the return on the portfolio during the corresponding time period, etc.

Figure 2:
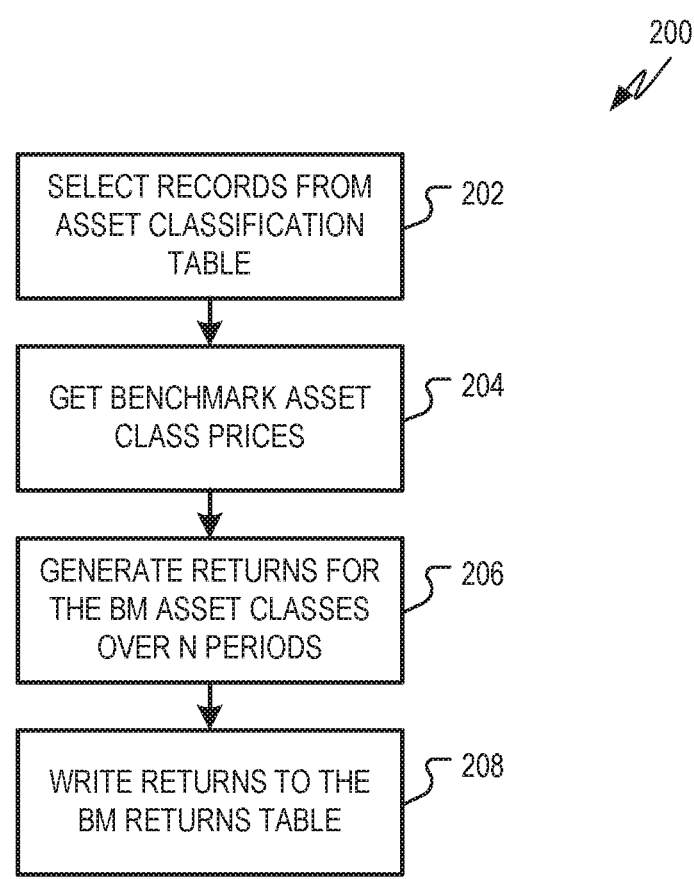
FIG. 2 is a flowchart showing one example of a process flow that may be executed by the user interface (UI) generator system to generate the benchmark (BM) return table of FIG. 1.

FIG. 2 is a flowchart showing one example of a process flow 200 that may be executed by the UI generator system 102 to generate the BM return table 108. In some examples, the process flow 200 may be executed once, for example, at the conclusion of a year, quarter, or other suitable time period. The resulting BM return table 108 may then be utilized to generate multiple examples of the portfolio returns table 110 and UI 120 for different accounts.

At operation 202, the UI generator system 102 may select records from the asset class table 106. The records selected may include records corresponding to asset classes that will be benchmarks for the UI 120. For example, the UI generator system 102 may execute a SQL SELECT operation or other suitable operation on the asset class table 106 to retrieve records corresponding to asset classes based on the UI indicator values for the records. For example, if the UI indicator field for a record indicates that it is to be a benchmark for the UI 120, the record may be returned at operation 202. In some examples, the process flow 200 may be executed to generate a BM return table 108 for a particular account type, such as, for example, an account including a tax free municipal bond portfolio. In this case, the UI generator system 102 may select records from the asset class table 106 having a value of the UI indicator field indicating that the record corresponds to a benchmark for tax free municipal bonds.

At operation 204, the UI generator system 102 may request and/or receive price data for the benchmark asset classes selected at operation 202 from one or more asset data systems 124. Price data may include prices for the different benchmark asset classes, over N periods, where N is the number of columns to be included in the UI 120. In some examples, prices for the benchmark asset classes may be expressed as unit values. The UI generator system 102 may receive prices for each benchmark asset class at the beginning and the end of each of the N periods. This may include N+1 prices for each benchmark asset class. For example, the UI generator system 102 may receive an end-of-period price for the benchmark asset classes at the end of each of the N periods plus the price at the end of the first period prior to the N periods. For example, if the UI 120 is to represent five time periods including 2010, 2011, 2012, 2013, and 2014, the UI generator system 102 may obtain asset class prices for the year end of 2009, 2010, 2011, 2012, 2013, and 2014. In some examples, prices for the various benchmark asset classes may be stored at columns of a table, such as the BM reference table 108

At operation 206, the UI generator system 102 may generate returns for the benchmark asset classes based on the benchmark asset class prices received at operation 204. Returns may be generated, for example, as given by Equation [1] below, although any other suitable measure may be used. In example of Equation [1], the value at the period beginning may be the same as the value at ten end of the preceding period. For example, where the benchmark asset prices are expressed as fields or columns in a records corresponding to benchmark assets, the value at the beginning of a period may be found by executing a lag operation on the field including the value at the beginning of the period.

$$\text{returns} = 1 - \frac{\text{value at period end}}{\text{value at period beginning}} \quad [1]$$

At operation 208, the UI generator system 102 may generate and/or update the BM return table 108. For example, the UI generator system 102 may write the returns determined at operation 206 to the BM return table 108. In some examples, the UI generator system 102 may also write to the BM return table 108 name and type data for a benchmark asset class. For example, name, type, and other similar data for a benchmark asset class may be added to the BM return table 108 utilizing a SQL JOIN operation to merge the relevant columns and/or rows from the asset class table 106 to the BM return table 108.

Figure 3:
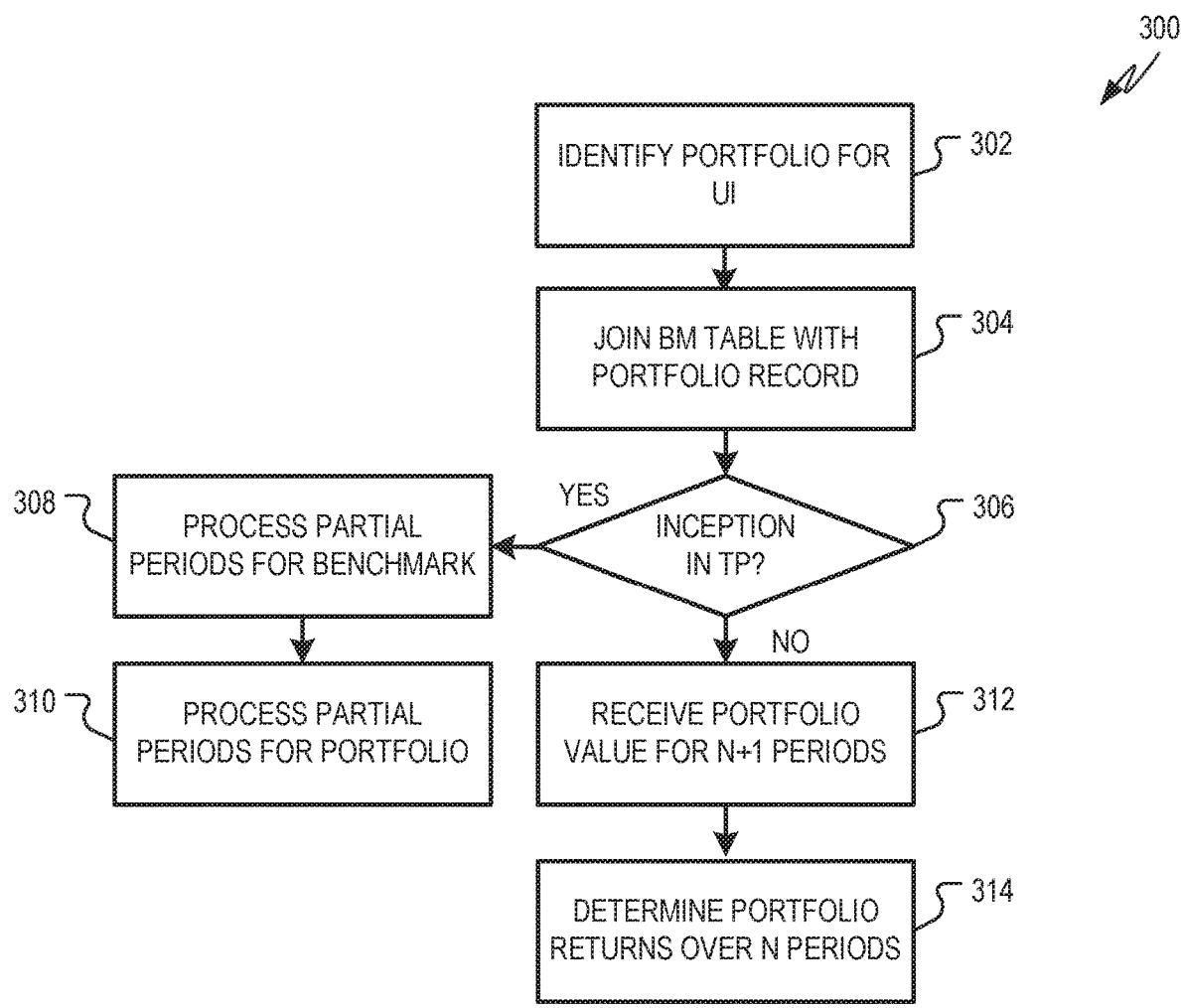
FIG. 3 is a flowchart showing one example of a process flow that may be executed by the UI generator system to generate a portfolio returns table for an account.

FIG. 3 is a flowchart showing one example of a process flow 300 that may be executed by the UI generator system 102 to generate a portfolio returns table 110 for a portfolio. For example, the process flow 300 may be executed by the UI generator system 102 for multiple different portfolios using the same BM returns table 108. At operation 302, the UI generator system 102 may identify a portfolio that is to be the subject of the UI 120. For example, the UI generator system 102 may receive an indication of the portfolio from the portfolio return system 130, from a batch process generating UIs 120 for different portfolios, etc. In some examples, the indication of the portfolio may include portfolio data allowing the UI generator system 102 to access data, such as unit value data, for the portfolio. The portfolio data may include, for example, a portfolio number, and/or a portfolio performance class key. The portfolio performance class key may indicate benchmark asset classes to be compared to the portfolio. For example, the portfolio performance class key may identify a particular BM table 108 to be used to generate the UI 120. In some examples, the portfolio data may also include formatting data indicating how tiles representing the portfolio are to be displayed at the UI 120.

At operation 304, the UI generator system 102 may join the BM table 108 with the portfolio data received at operation 302 to form the portfolio returns table 110. For example, the portfolio returns table 110 may be a copy of the BM table 108 with an additional record or records corresponding to the portfolio.

At operation 306, the UI generator system 102 may determine whether an inception date for the portfolio is during the relevant N time periods. If yes, then the UI generator system 102 may optionally process one or more partial periods for the benchmark asset classes (operation 308) and for the portfolio (operation 310).

If the inception date is before the time periods, then the UI generator system 102 may receive portfolio value data describing the value of the portfolio over the N+1 time periods described above. Any suitable price or value indicator may be included in the value data including, for example, a unit value. At operation 314, the UI generator system 102 may determine the return for the portfolio over the N time periods, for example, as described above with respect to Equation [1]. Returns may be written to the portfolio returns table 110. For example, the portfolio returns table may comprise N columns for returns corresponding to the N periods. Records for the benchmark asset classes may have values at the N columns including the returns for the benchmark assets classes that were copied from the BM returns table 108 and calculated as described with respect to FIG. 2.

In some examples, the UI generator system 102 may generate partial returns for the last or most recent time period, for example, if that time period has not yet expired. For example, the UI generator system 102 may receive a most recent end of quarter (EOQ) value for the most recent time period and may calculate benchmark returns and portfolio returns from the beginning of the most recent time period to the last end of quarter or other partial price value. In some examples, the UI generator system 102 may generate partial returns for the last time period for the benchmark asset classes while generating the portfolio return table 110 for a particular portfolio. In other examples, the UI generator system 102 may generate partial returns for the last time period for benchmark asset classes while generating the BM returns table 108. When the UI generator system 102 determines returns over less than all of the most recent time period, this may be written to the portfolio returns table 110 to be displayed at the UI 120. For example, the column of the UI 120 corresponding to the last time period may be marked with "YTD" or another indicator that the column represents partial returns.

Referring back to operation 306, if the inception date for the portfolio is during one of the periods, the UI generator system 102 may process one or more partial periods for the benchmark asset classes. For example, the inception date for the portfolio may fall within one of the N periods (an inception period). When this occurs, the UI generator system 102, when generating the portfolio returns table 110, may calculate and incorporate partial period returns for the inception period for both the portfolio and for the benchmark asset classes. For example, at operation 308, the UI generator system 102 may determine partial returns for the benchmark asset classes at the inception period for the portfolio. For example, the UI generator system 102 may query the asset data system 124 to receive prices or values for the benchmark asset classes at the point during the inception period when the portfolio was formed. Partial returns for the benchmark asset classes, then, may be measured from the point when the portfolio was formed to the end of the inception period. Partial returns for the benchmark asset classes at the inception period may be written to the portfolio returns table 110, for example, overwriting the benchmark asset class returns for the inception period copied from the BM returns table 108 or may be added to a new column at the portfolio returns table 110.

At operation 310, the UI generator system 102 may determine portfolio returns for the portfolio over the N periods. For periods after the inception period, the portfolio returns may be determined as described herein with respect to operations 312 and 314. For periods prior to the inception period, the UI generator system 102 may return a null value for the portfolio returns. The null value may be any value indicating that the portfolio did not exist during the time period and, therefore, had no return value. For the inception time period, the UI generator system 102 may obtain a unit value of the portfolio at the time of inception and at the end of the inception time period. From this, the UI generator system 102 may generate a partial return for the portfolio at the inception period.

Figure 4:
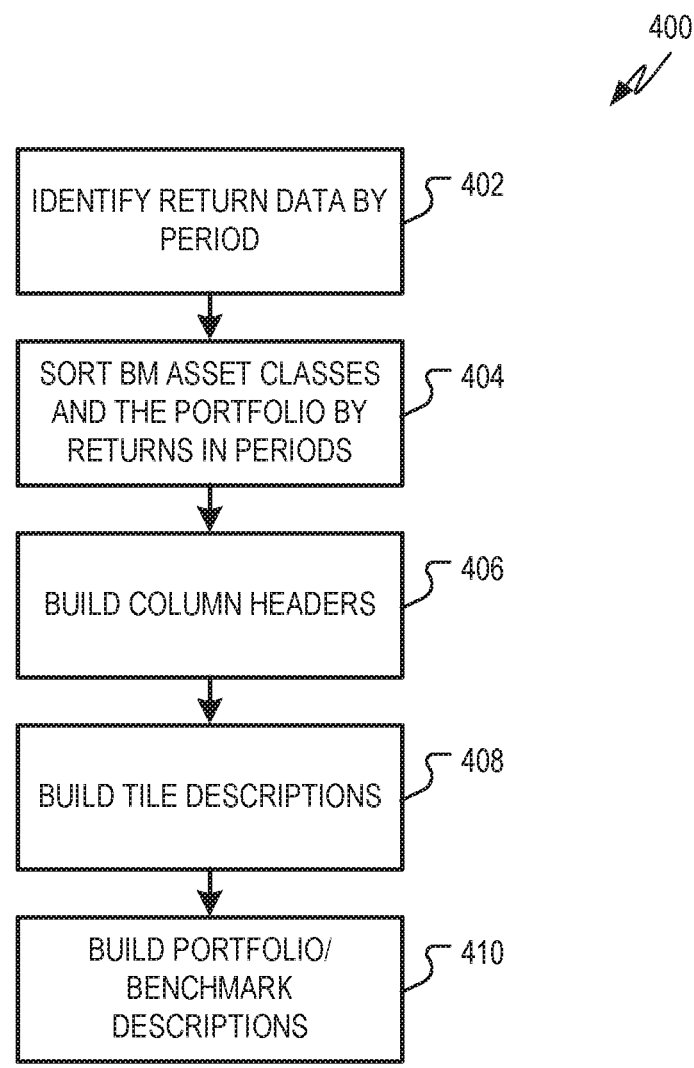
FIG. 4 is a flowchart showing one example of a process flow that may be executed by the UI generator system to generate the UI of FIG. 1.

FIG. 4 is a flowchart showing one example of a process flow 400 that may be executed by the UI generator system 102 to generate the UI 120 from the portfolio returns table 110. At optional operation 402, the UI generator system 102 may identify return data by period. At optional operation 402, the UI generator system 102 may sort the benchmark asset classes and portfolios by returns in each of the N time periods. For periods where the return of the portfolio is marked with the null value, indicating that the portfolio did not exist in that period, the UI generator system 102 may rank the portfolio at a predetermined position. For example, the UI generator system 102 may rank a portfolio having the null value for a period as having the lowest return.

The rankings at operation 404 may be used to position tiles in the respective columns of the UI 120. A tile may correspond to the portfolio and/or to a benchmark asset class, as described. For time periods where the portfolio did not exist, the tile corresponding to the portfolio may be positioned at a position corresponding to the ranking of the portfolio corresponding to the null value for returns, described above. Also, in some examples, for time periods where the portfolio did not exist, the tile corresponding to the portfolio may be omitted, leaving a blank position in the corresponding column, for example, at the top or bottom.

At operation 406, the UI generator system 102 may generate column headers for the columns. A column header may describe the time period corresponding to the column, for example, with a label. For the column corresponding to the inception time period or a most recently and incomplete time period, the header may indicate that the returns for the time period represent less than all of the time period. At operation 408, the UI generator system 102 may build tile descriptions for the UI 120, for example, from descriptive data for the benchmark asset classes and/or portfolio included at the portfolio returns table 110. In some examples, described herein, tiles corresponding to the portfolio may be represented differently than the tiles corresponding to benchmark asset classes. For example, portfolio tiles may be a different color, a different shape, etc. This may enable a user to easily spot the portfolio tiles in the UI 120. In some examples, the UI generator system 102 may add to the UI 120 a portfolio tile trace that comprises a line or other indication tracing the positions of the portfolio tiles across the UI 120.

At operation 410, the UI generator system 102 may build portfolio and benchmark asset class descriptions. These descriptions, for example, may be included in the portfolio returns table 110 at various fields.

Figure 5:
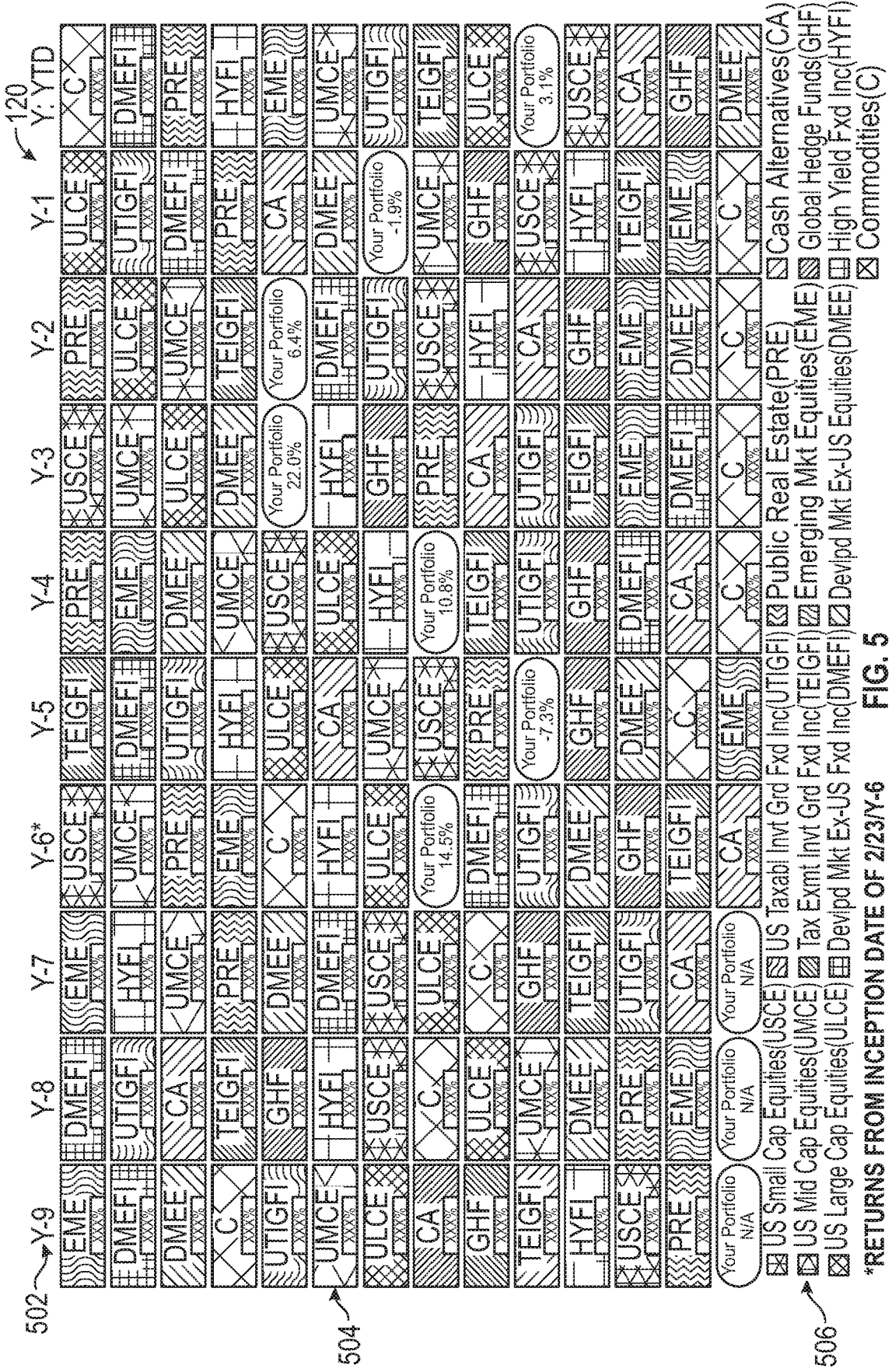
FIG. 5 is a screen shot showing one example of the UI of FIG. 1

FIG. 5 is a screen shot showing one example of the UI 120. In the example of FIG. 5, the UI 120 comprises ten columns corresponding to ten time periods (e.g. years) indicated as Y, Y-1, Y-2, Y-3, Y-4, Y-5, Y-6, Y-7, Y-8, and Y-10. The columns and tiles are included in a column section 504. A column header section 502 shows time period labels for the various columns. The various tiles shown in FIG. 5 may have different colors by asset class. In some examples, each distinct benchmark asset class is represented by a distinct color. All tiles may be colored with the color corresponding to their asset class. The "Your Portfolio" tiles may also have an associated color, e.g., a color that is different from the colors associated with the benchmark asset classes. Also, in some examples, tiles may indicate the full name of an account or may show an abbreviation of the name of an asset class, for example, to satisfy space constraints.

In the example shown in FIG. 5, the time period labels indicate that the time period Y-6 was the inception time period for the portfolio. Accordingly, the ranking of the returns of the portfolio (called Your Portfolio) and the benchmark asset classes are for a partial period from the inception date (e.g., 2/23/Y-6) to the end of Y-6. The column header for the year Y-6 at section 502 includes an asterisk corresponding to a message in the UI 120 (e.g. positioned lower than the column section 504) and explaining that returns for Y-6 indicate only returns after 2/23/Y-6. Also, in the example of FIG. 5, the Your Portfolio tile is shown as having the lowest return in the time periods prior to the inception time period (e.g., Y-7, Y-8, Y-9).

In the example of FIG. 5, the UI generator system 102 has also generated partial returns for the most recent time period (e.g., Y). This is indicated by the column header for the Y time period column, which indicates that the column is year-do-date (YTD). FIG. 5 also shows a key section 506 include descriptions of the various benchmark asset classes. The various tiles shown in FIG. 5 include fields, indicated by "xxx %" that may include numerical or other representations of the return values determined for the corresponding benchmark asset classes or the portfolio at the indicated periods.

Figure 6:
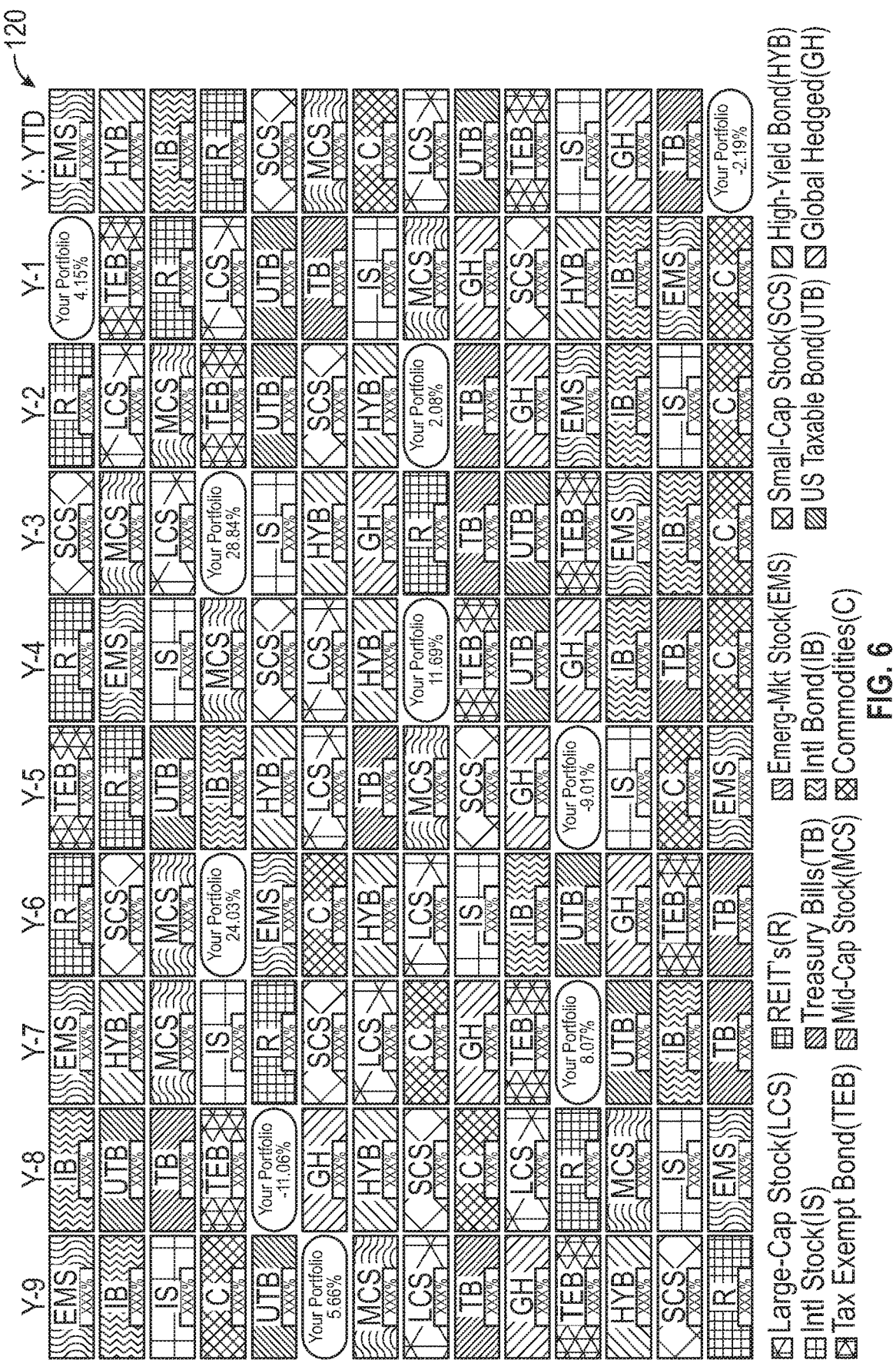
FIG. 6 is a screen shot showing another example of the UI of FIG. 1.

FIG. 6 is a screen shot showing one example of the UI 120. In the example of FIG. 6, the inception date for the portfolio is prior to the displayed time periods. The most recent time period (e.g., Y) is a partial time period similar to what was shown in FIG. 5. In FIG. 6, the tiles corresponding to the portfolio (e.g., labeled "Your Portfolio") are displayed differently than other tiles. For example, in FIG. 6, the "Your Portfolio" tiles are white while the other tiles have different colors. Also, in FIG. 6, the "Your Portfolio" tiles have rounded corners while the other tiles are square.

Figure 7:
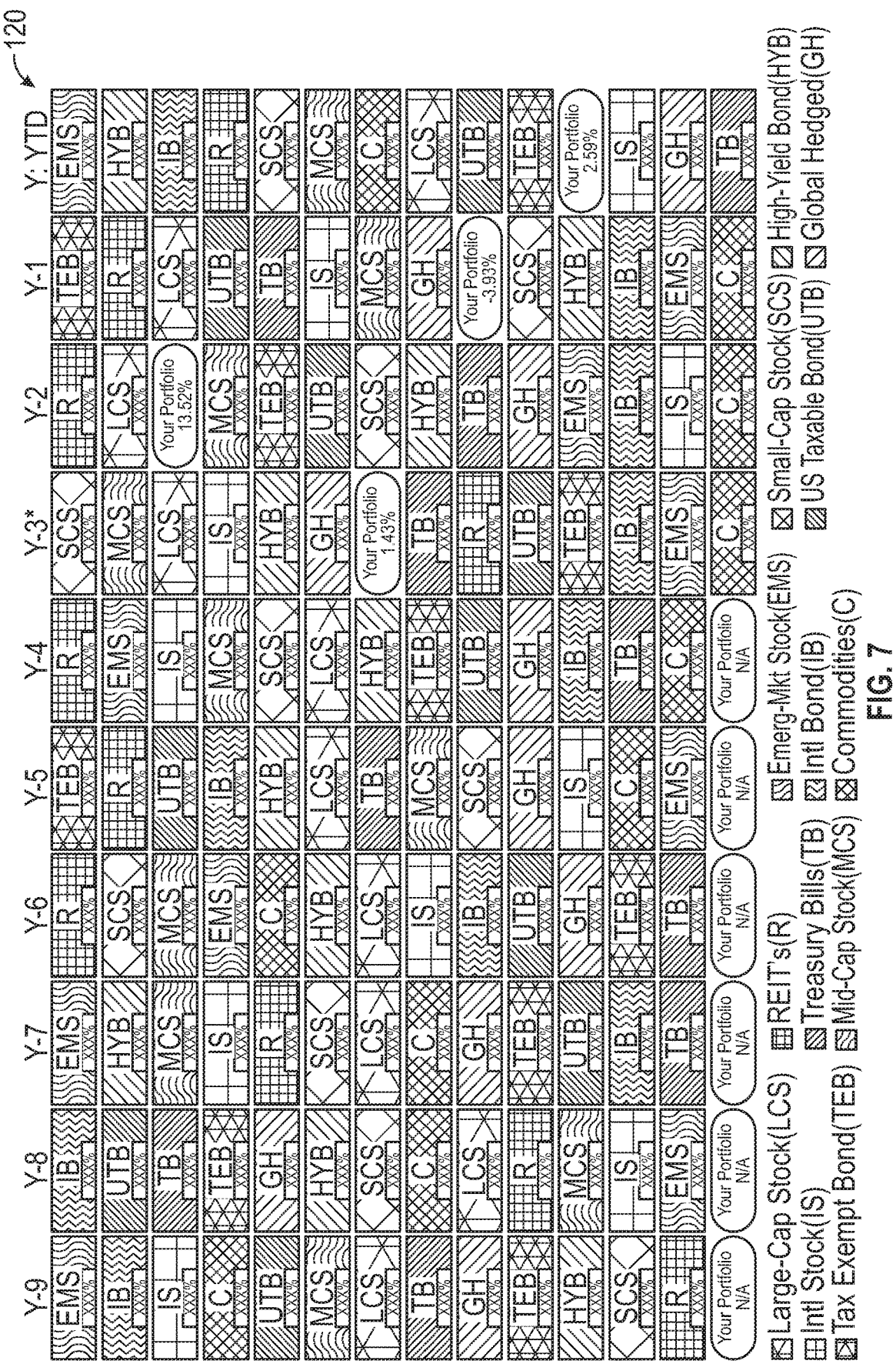
FIG. 7 is a screen shot showing another example of the UI of FIG. 1.

FIG. 7 is a screen shot showing another example of the UI 120. In the example of FIG. 7, the inception date for the portfolio is during the time period Y-3. Accordingly, the column corresponding to Y-3 indicates partial returns after the inception date, for example, by included an asterisk "*" after the indication of the period. Columns corresponding to years prior to Y-3 show the "Your Portfolio" tile at the bottom. Also, as shown, the color of the "Your Portfolio" tile is different in years prior to the portfolio inception than in years after the portfolio inception. For example, the "Your Portfolio" tile may be gray for years prior to the portfolio inception and white for the year of the portfolio inception and years after that. Also, in some examples, as shown in FIG. 7, the "Your Portfolio" tile has a different shape (e.g., rounded) in the year of portfolio inception and/or years thereafter than it does prior to portfolio inception (e.g., square or rectangular).

Figure 8:
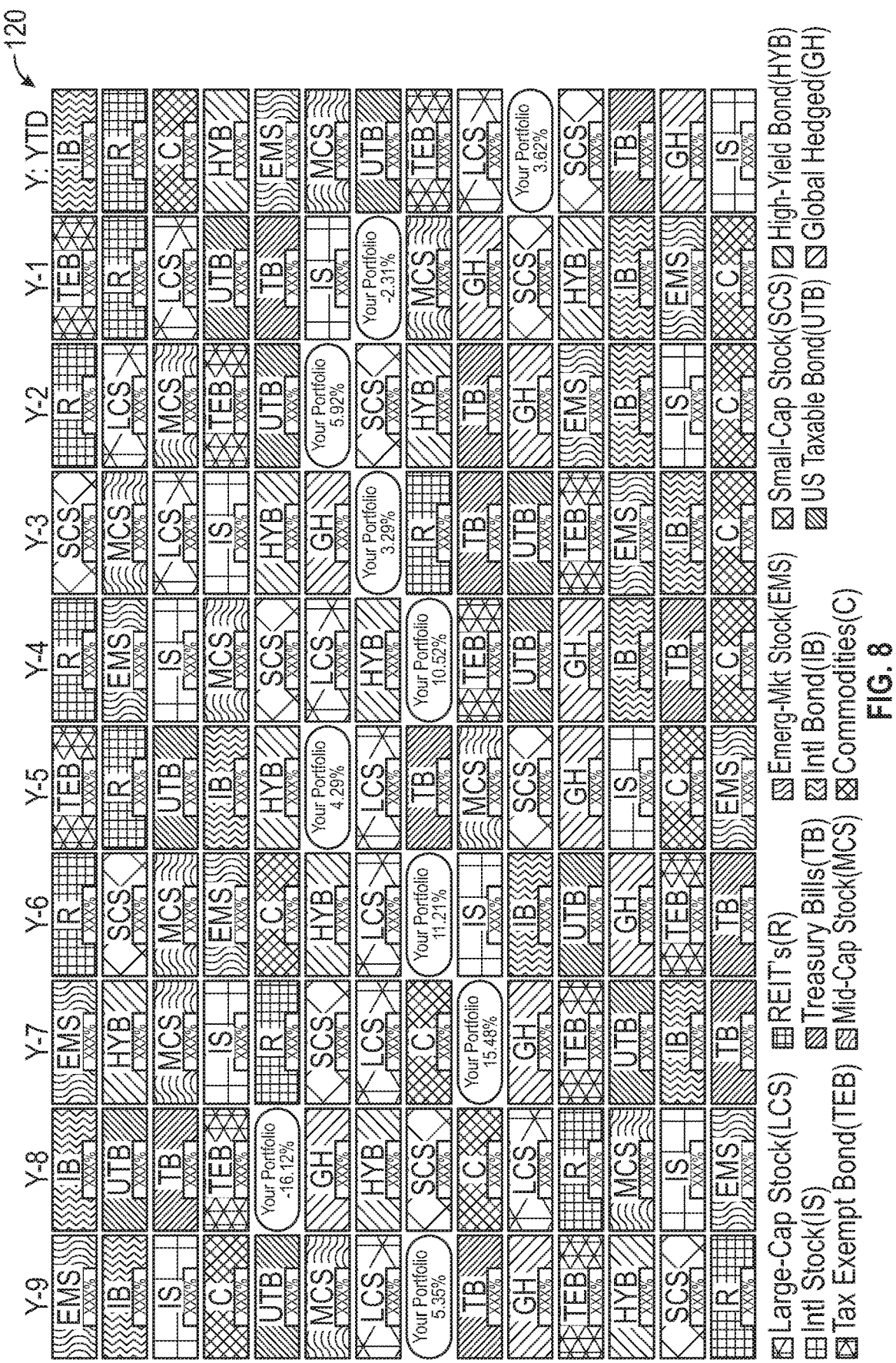
FIG. 8 is screen shot showing another example of the UI of FIG. 1.

FIG. 8 is screen shot showing another example of the UI 120. In the example of FIG. 8, the inception date for the portfolio is prior to the first time period (e.g., Y-9). Also, the "Your Portfolio" tiles are formatted with an elliptical shape which contrasts with the rectangular shape of the other tiles.

Figure 9:
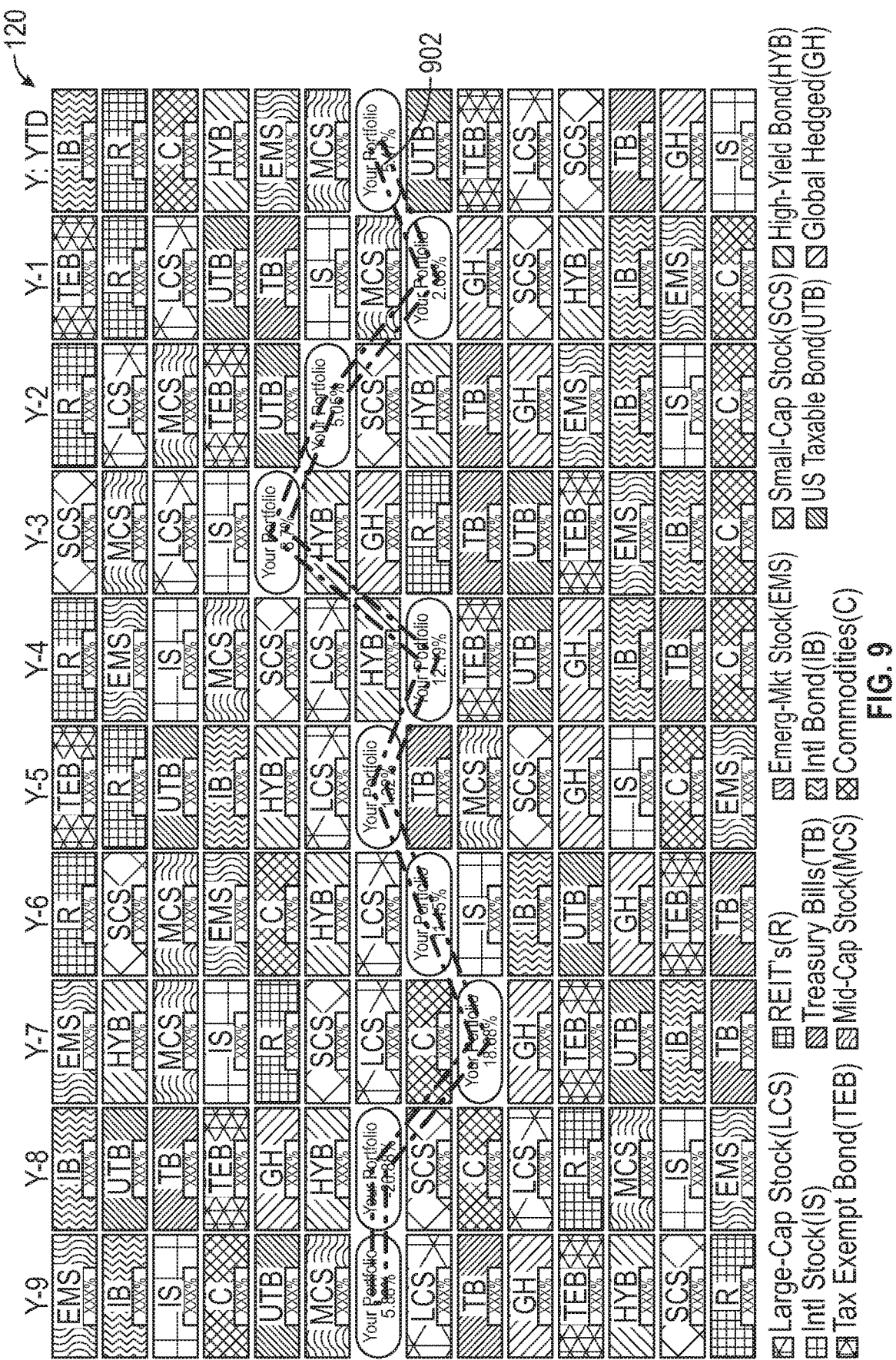
FIG. 9 is a screen shot showing yet another example of the UI of FIG. 1 including an account tile trace.
Figure 10:
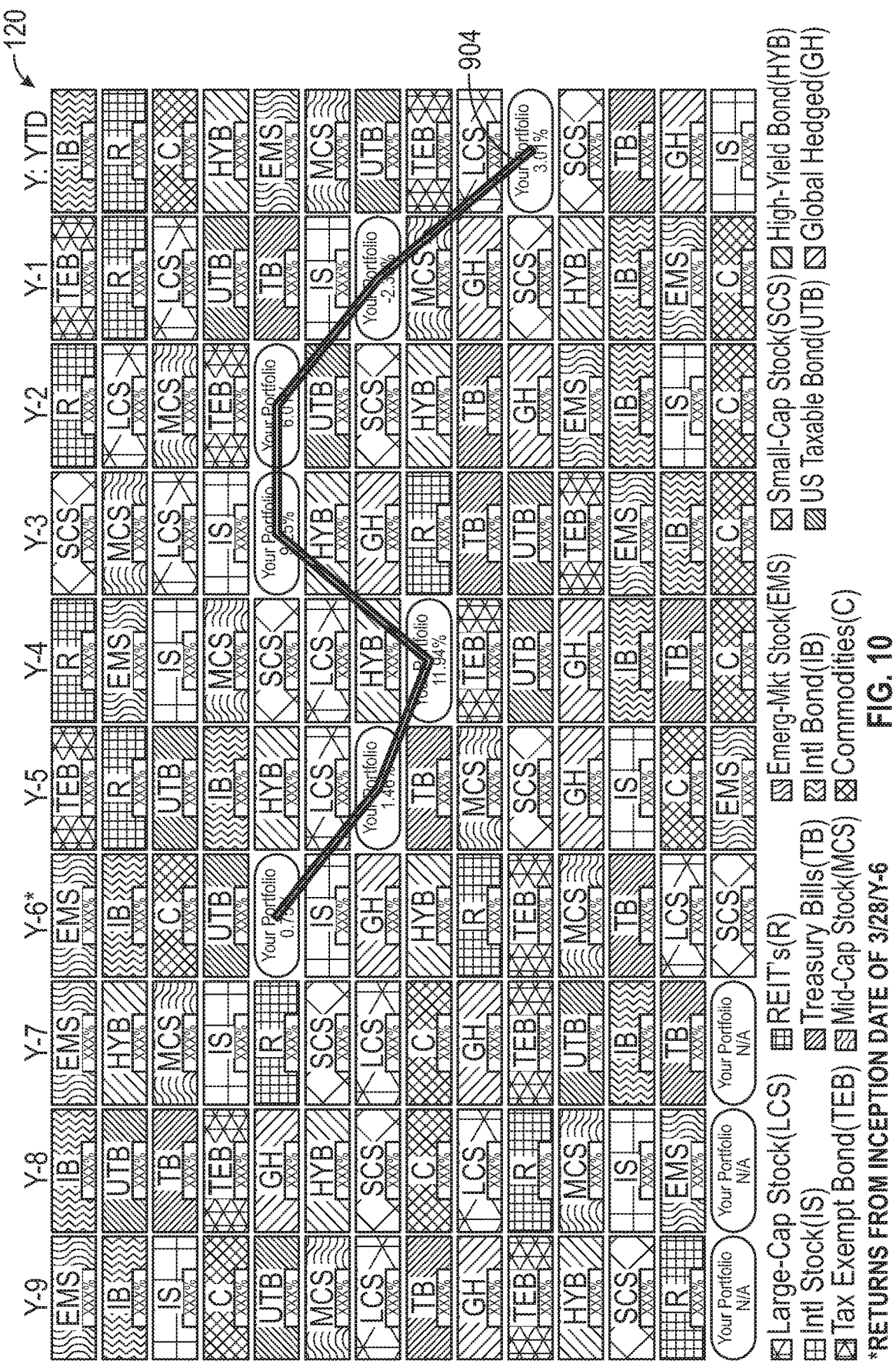
FIG. 10 is a screen shot showing another example of the UI of FIG. 1 with an account tile trace.

FIG. 9 is a screen shot showing yet another example of the UI 120 including a portfolio tile trace 902. As shown, the portfolio tile trace 902 is a semi-transparent line that connects tiles corresponding to the portfolio returns, labeled "Your Portfolio" across the time periods. FIG. 10 is a screen shot showing another example of the UI 120 with a portfolio tile trace 904. In the example of FIG. 10, the portfolio inception date was in the time period Y-6. As illustrated, the portfolio tile trace 904 tracks only tiles corresponding to portfolio returns at and after the inception time period.

Figure 11:
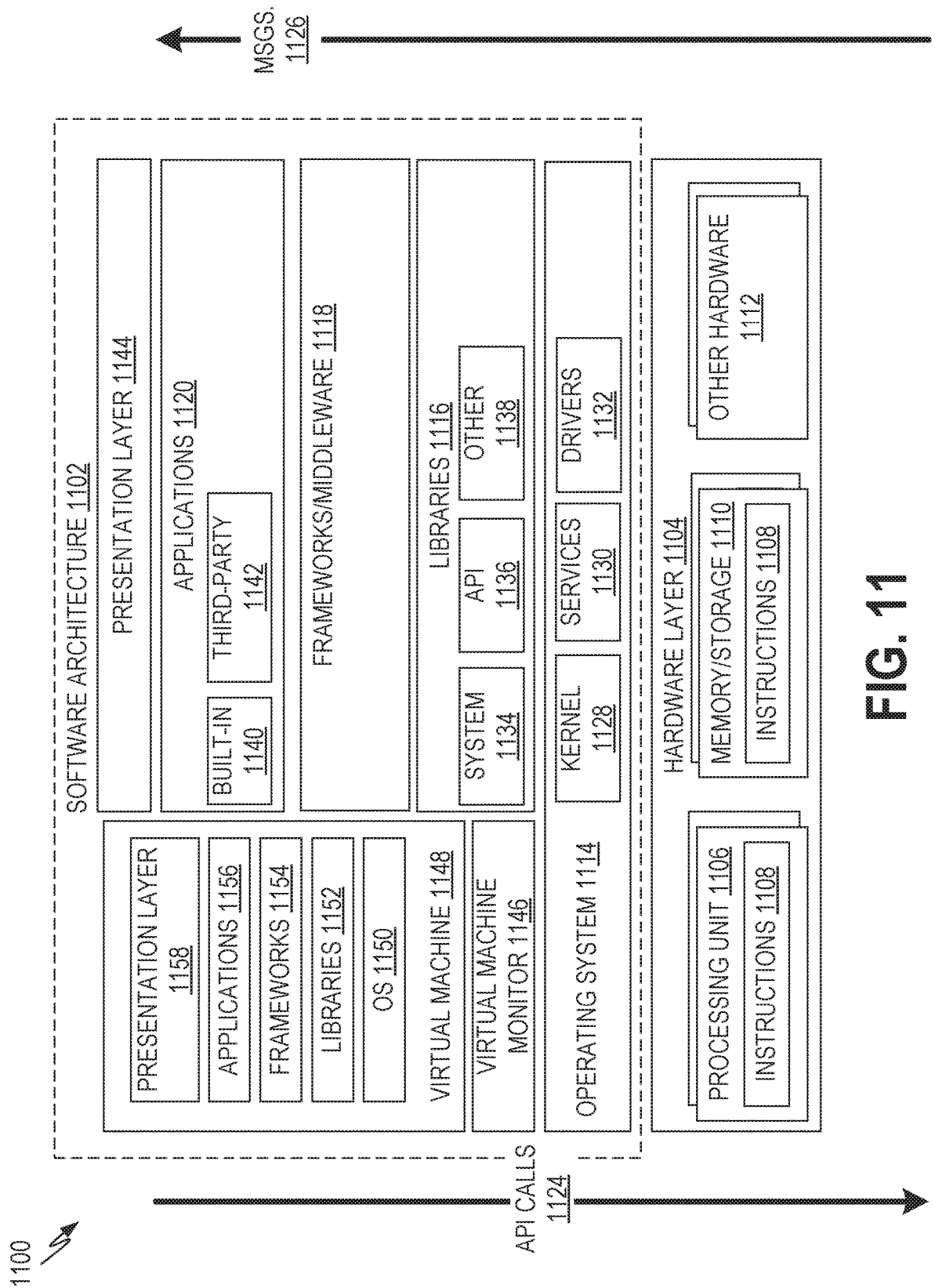
FIG. 11 is a block diagram showing one example of a software architecture for a computing device.

FIG. 11 is a block diagram 1100 showing one example of a software architecture 1102 for a computing device. For example, the block diagram 1100 may describe the software architecture 1102 of any of the computing devices described herein including, for example, the UI generator system 102, the asset data system 124, the portfolio return system 130, etc. The software architecture 1102 may be used in conjunction with various hardware architectures, for example, as described herein. FIG. 11 is merely a non-limiting example of a software architecture, and many other architectures may be implemented to facilitate the functionality described herein. A representative hardware layer 1104 is illustrated and can represent, for example, any of the above-referenced computing devices. In some examples, the hardware layer 1104 may be implemented according to the architecture 1200 described herein with respect to FIG. 12.

The representative hardware layer 1104 comprises one or more processing units 1106 having associated executable instructions 1108. The executable instructions 1108 represent the executable instructions of the software architecture 1102, including implementation of the methods, modules, subsystems, components, and so forth of FIGS. 1-4. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the hardware architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature, and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an ISR when the interrupt is received. For example, when an alert message is pushed to a computing device arranged according to the software architecture 1102, it may include or trigger an interrupt. The interrupt service may cause the software architecture 1102 to execute an ISR that launches the appropriate user interface (e.g., UI 120) and displays the received alert message.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as the operating system 1114 to facilitate functionality described herein.

The applications 1120 may utilize built-in operating system functions (e.g., kernel 1128, services 1130, and/or drivers 1132), libraries (e.g., system libraries 1134, API libraries 1136, and other libraries 1138), or frameworks/middleware 1118 to create user interfaces to interact with users of the system. Alternatively, or additionally, in some systems interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Figure 12:
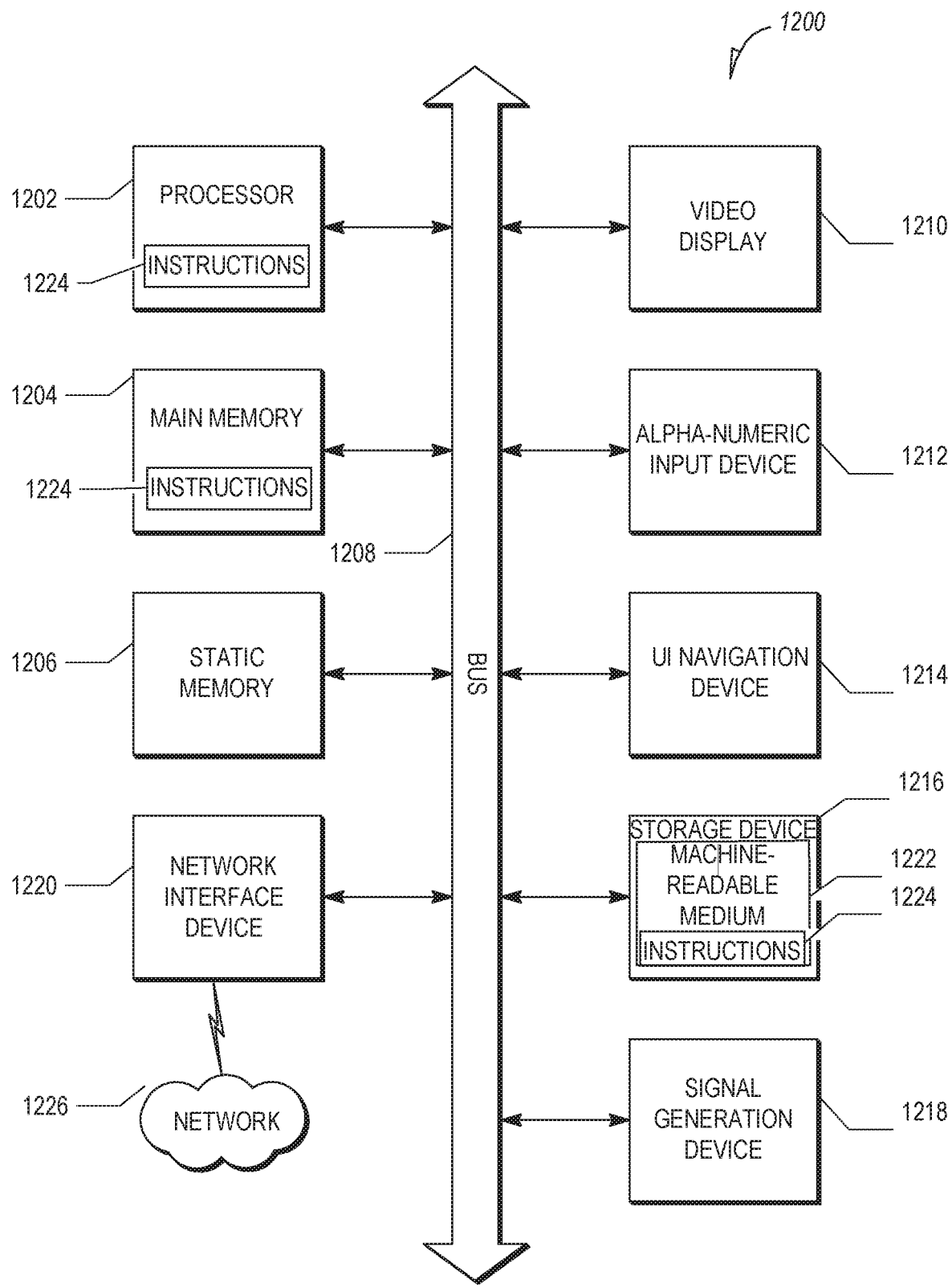
FIG. 12 is a block diagram illustrating a computing device hardware architecture, within which a set or sequence of instructions can be executed to cause the computing device to perform examples of any one or more of the methodologies discussed herein.

FIG. 12 is a block diagram illustrating a computing device hardware architecture 1200, within which a set or sequence of instructions can be executed to cause the computing device to perform examples of any one or more of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify actions to be taken by that machine. The architecture 1200 may describe a hardware configuration of, for example, the UI generator system 102, the asset data system 124, the portfolio return system 130, etc.

Example architecture 1200 includes a processor unit 1202 comprising at least one processor (e.g., a central processing unit (CPU), a graphics processing unit (GPU), both a CPU and a GPU, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a user interface (UI) navigation device 1214 (e.g., a mouse). In some examples, the video display unit 1210, alphanumeric input device 1212, and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

In some examples, the processor unit 1202 or another suitable hardware component may support a hardware interrupt. In response to a hardware interrupt, the processor unit 1202 may pause its processing and execute an ISR. For example, an alert message may include and/or trigger a hardware interrupt. The ISR for the hardware interrupt may launch or modify the appropriate user interface (e.g., the UI 120) and display the received alert message.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, within the static memory 1206, and/or within the processor unit 1202 during execution thereof by the architecture 1200, with the main memory 1204, the static memory 1206, and the processor unit 1202 also constituting machine-readable media. The instructions 1224 stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium"

shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a LAN, a WAN, the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Figure 13:
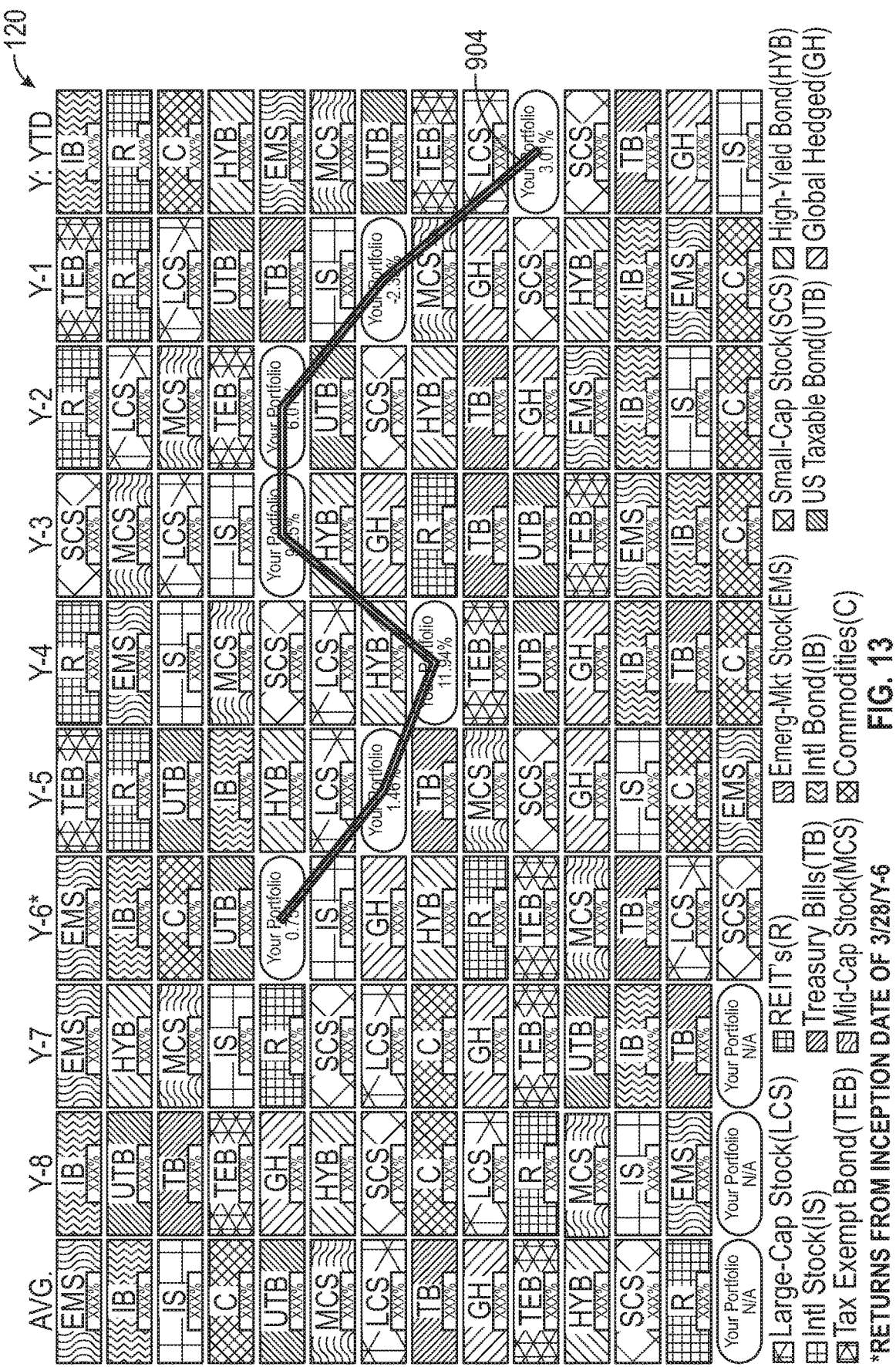
FIG. 13 is screen shot showing one example of the UI of FIG. 1 with an "Average" column, marked "AVG."

FIG. 13 is screen shot showing one example of the UI 120 with an "Average" column, marked "AVG." The AVG. column may rank an average of the returns of the portfolio and the benchmark asset classes over a set of time periods. For example, the average column may rank the average of the returns over the other years shown at the UI 120. The AVG. column is shown on the far left of the UI 120, however, in some examples, it may be displayed at other positions, such as to the right, in the middle, etc. Also, in some examples, the AVG. column may be offset from the other columns.

FIG. 14 is a screen shot showing another example of the UI 120 including both a partial return and a full return column for the inception year of the portfolio. In the example of FIG. 14, the inception year for the portfolio is Y-6. Accordingly, a column labeled Y-6* shows a ranking of the returns of the benchmark asset classes for the partial year from the inception date of the portfolio. The example of FIG. 14 also includes a column labeled Y-6 that displays returns for the benchmark asset classes over the full period Y-6. Because the portfolio did not exist for the full period, its return may be null, causing it to be listed, for example, as the lowest return during the full period Y-6.

Also, in some examples, the UI 120 may be arranged tiles or other indicators of the returns of benchmark asset classes and the portfolio positioned on an axis set. For example, a horizontal axis may indicate period and the vertical axis may indicate returns. In this way, a viewer of the UI may receive a visual indication of the difference between the returns of various benchmark asset classes and the portfolio.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for generating a user interface, comprising:
   a computing device comprising a processor unit and a memory, wherein the computing device is programmed to perform operations comprising:
   accessing a benchmark return data structure describing returns for a plurality of benchmark asset classes over N time periods;
   determining a set of N returns for a first account over the N time periods;
   generating an account returns data structure based at least in part on the benchmark return data structure and the returns for the first account over the N time periods; and
   generating the user interface based at least in part on the account returns data structure, wherein the user interface comprises a set of N columns, wherein the set of N columns comprises a first column corresponding to a first time period of the N time periods, wherein the first column comprises a first tile corresponding to a first benchmark asset class of the plurality of benchmark asset classes, a second tile corresponding to a second benchmark asset class of the plurality of benchmark asset classes, and a third tile corresponding to the first account, wherein the first tile, the second tile, and the third tile are positioned in the first column based at least in part on returns for the first account, the first benchmark asset class, and the second benchmark asset class in the first time period.

2. The system of claim 1, wherein the computing device is further programmed to perform operations comprising:
   accessing an asset class data structure comprising a plurality of records, wherein a first record of the plurality of records describes the first asset class and a second record of the plurality of records describes the second asset class;
   selecting from the asset class data structure a first set of the plurality of records for the user interface, wherein the first set of the plurality of records comprises the first record and the second record;

determining a set of N period returns for the first asset class over the N time periods;

determining a set of N period returns for the second asset class over the N time periods;

joining at least a portion of the plurality of records with the set of N period returns for the first asset class and the set of N period returns for the second asset class to form the benchmark return data structure;

receiving data describing a first account for the user interface;

determining a set of N period returns for the first account over the N time periods;

joining the set of N period returns for the first account with at least a portion of the benchmark return data structure to form the account returns data structure; and at the account returns data structure, sorting a first period return for the first asset class at a first time period of the N time periods, a first period return for the second asset class at the first time period, and a first period return for the first account at the first time period.

3. The system of claim 1, wherein the computing device is further programmed to perform operations comprising determining that an inception date for the first account was before the N time periods.

4. The system of claim 1, wherein the computing device is further programmed to perform operations comprising:

receiving data describing a second account for the user interface, wherein the data also describes an inception date for the second account that is after the first time period of the N time periods, during the second time period of the N time periods, and after a third time period of the N time periods;

determining a return for the second account at the third time period;

determining a partial period return for the second account from the inception date of the second account to an end of the second time period; and generating a second user interface for the second account based at least in part on the return for the second account at the third time period and the partial period return for the second account from the inception date of the second account to the end of the second time period.

5. The system of claim 4, wherein the computing device is further programmed to perform operations comprising joining the period return for the second account at the third time period and the partial period return for the second account from the inception date of the second account to the end of the second time period with at least a portion of the benchmark return data structure to form a second account returns data structure, wherein the second user interface for the second account is generated based at least in part on the second account returns data structure.

6. The system of claim 1, wherein the first tile and the second tile have a first shape and the third tile has a second shape different than the first shape.

7. The system of claim 1, wherein the set of N columns further comprises a second column corresponding to a second time period of the N time periods, wherein the second column comprises:

a fourth tile corresponding to the first benchmark asset class;

a fifth tile corresponding to the second benchmark asset class; and a sixth tile corresponding to the first account, wherein the fourth tile, the fifth tile, and the sixth tile are ordered in the second column based at least in part on returns for the first account in the second time period, returns for the first benchmark asset class in the second time period, and returns for the second benchmark asset class in the second time period.

8. The system of claim 7, wherein the set of N columns further comprises a third column corresponding to a third time period of the N time periods, wherein the third column comprises:

a seventh tile corresponding to the first benchmark asset class;

a eighth tile corresponding to the second benchmark asset class; and a ninth tile corresponding to the first account, wherein the seventh tile, the eighth tile, and the ninth tile are ordered in the third column based at least in part on returns for the first account in the third time period, returns for the first benchmark asset class in the third time period, and returns for the second benchmark asset class in the third time period.

9. The system of claim 8, wherein the user interface further comprises portfolio tile trace connecting the third tile, the sixth tile, and the ninth tile.

10. The system of claim 1, wherein the set of N columns further comprises an average column, the average column comprising:

a fourth tile corresponding to the first benchmark asset class;

a fifth tile corresponding to the second benchmark asset class; and a sixth tile corresponding to the first account, wherein the fourth tile, the fifth tile, and the sixth tile are ordered in the average column based at least in part on average of returns for the first account over the N time periods, average of returns for the first benchmark asset class over the N time periods, and average of returns for the second benchmark asset class over the N time periods.

11. The system of claim 1, wherein an inception date for the first account is a second time period, wherein the set of N columns further comprises a second column comprising a fourth tile, a fifth tile, and a sixth tile, wherein the fourth tile, the fifth tile, and the sixth tile are ordered in the second column based at least in part on a partial return for the first asset class from the inception date to an end of the second time period, a partial return for the second asset class from the inception date to the end of the second time period, and a return for the first account from the inception date to the end of the second time period.

12. A method for generating a user interface, comprising:

accessing a benchmark return data structure describing returns for a plurality of benchmark asset classes over N time periods;

determining a set of N returns for a first account over the N time periods;

generating an account returns data structure based at least in part on the benchmark return data structure and the returns for the first account over the N time periods; and generating the user interface based at least in part on the account returns data structure, wherein the user interface comprises a set of N columns, wherein the set of N columns comprises a first column corresponding to a first time period of the N time periods, wherein the first column comprises a first tile corresponding to a first benchmark asset class of the plurality of benchmark asset classes, a second tile corresponding to a second benchmark asset class of the plurality of benchmark asset classes, and a third tile corresponding to the first account, wherein the first tile, the second tile, and the third tile are positioned in the first column based at least in part on returns for the first account, the first benchmark asset class, and the second benchmark asset class in the first time period.

13. The method of claim 12, further comprising:
accessing an asset class data structure comprising a plurality of records, wherein a first record of the plurality of records describes the first asset class and a second record of the plurality of records describes the second asset class;
selecting from the asset class data structure a first set of the plurality of records for the user interface, wherein the first set of the plurality of records comprises the first record and the second record;
determining a set of N period returns for the first asset class over the N time periods;
determining a set of N period returns for the second asset class over the N time periods;
joining at least a portion of the plurality of records with the set of N period returns for the first asset class and the set of N period returns for the second asset class to form the benchmark return data structure;
receiving data describing a first account for the user interface;
determining a set of N period returns for the first account over the N time periods;
joining the set of N period returns for the first account with at least a portion of the benchmark return data structure to form the account returns data structure; and
at the account returns data structure, sorting a first period return for the first asset class at a first time period of the N time periods, a first period return for the second asset class at the first time period, and a first period return for the first account at the first time period.

14. The method of claim 12, wherein the first tile and the second tile have a first shape and the third tile has a second shape different than the first shape.

15. The method of claim 12, wherein the set of N columns further comprises a second column corresponding to a second time period of the N time periods, wherein the second column comprises:
a fourth tile corresponding to the first benchmark asset class;
a fifth tile corresponding to the second benchmark asset class; and
a sixth tile corresponding to the first account, wherein the fourth tile, the fifth tile, and the sixth tile are ordered in the second column based at least in part on returns for the first account in the second time period, returns for the first benchmark asset class in the second time period, and returns for the second benchmark asset class in the second time period.

16. The method of claim 15, wherein the set of N columns further comprises a third column corresponding to a third time period of the N time periods, wherein the third column comprises:
a seventh tile corresponding to the first benchmark asset class;
a eighth tile corresponding to the second benchmark asset class; and
a ninth tile corresponding to the first account, wherein the seventh tile, the eighth tile, and the ninth tile are ordered in the third column based at least in part on returns for the first account in the third time period, returns for the first benchmark asset class in the third time period, and returns for the second benchmark asset class in the third time period.

17. The method of claim 16, wherein the user interface further comprises portfolio tile trace connecting the third tile, the sixth tile, and the ninth tile.

18. The method of claim 12, wherein the set of N columns further comprises an average column, the average column comprising:
a fourth tile corresponding to the first benchmark asset class;
a fifth tile corresponding to the second benchmark asset class; and
a sixth tile corresponding to the first account, wherein the fourth tile, the fifth tile, and the sixth tile are ordered in the average column based at least in part on average of returns for the first account over the N time periods, average of returns for the first benchmark asset class over the N time periods, and average of returns for the second benchmark asset class over the N time periods.

19. The method of claim 12, wherein an inception date for the first account is a second time period, wherein the set of N columns further comprises a second column comprising a fourth tile, a fifth tile, and a sixth tile, wherein the fourth tile, the fifth tile, and the sixth tile are ordered in the second column based at least in part on a partial return for the first asset class from the inception date to an end of the second time period, a partial return for the second asset class from the inception date to the end of the second time period, and a return for the first account from the inception date to the end of the second time period.

20. A machine-readable medium comprising instructions thereon that, when executed by a computing device, causes the computing device to perform operations comprising:
accessing a benchmark return data structure describing returns for a plurality of benchmark asset classes over N time periods;
determining a set of N returns for a first account over the N time periods;
generating an account returns data structure based at least in part on the benchmark return data structure and the returns for the first account over the N time periods; and
generating a user interface based at least in part on the account returns data structure, wherein the user interface comprises a set of N columns, wherein the set of N columns comprises a first column corresponding to a first time period of the N time periods, wherein the first column comprises a first tile corresponding to a first benchmark asset class of the plurality of benchmark asset classes, a second tile corresponding to a second benchmark asset class of the plurality of benchmark asset classes, and a third tile corresponding to the first account, wherein the first tile, the second tile, and the third tile are positioned in the first column based at least in part on returns for the first account, the first benchmark asset class, and the second benchmark asset class in the first time period.

* * * * *